Feb. 2, 1954 J. CRITES 2,667,944
CYCLONE SEPARATOR
Filed Dec. 10, 1949
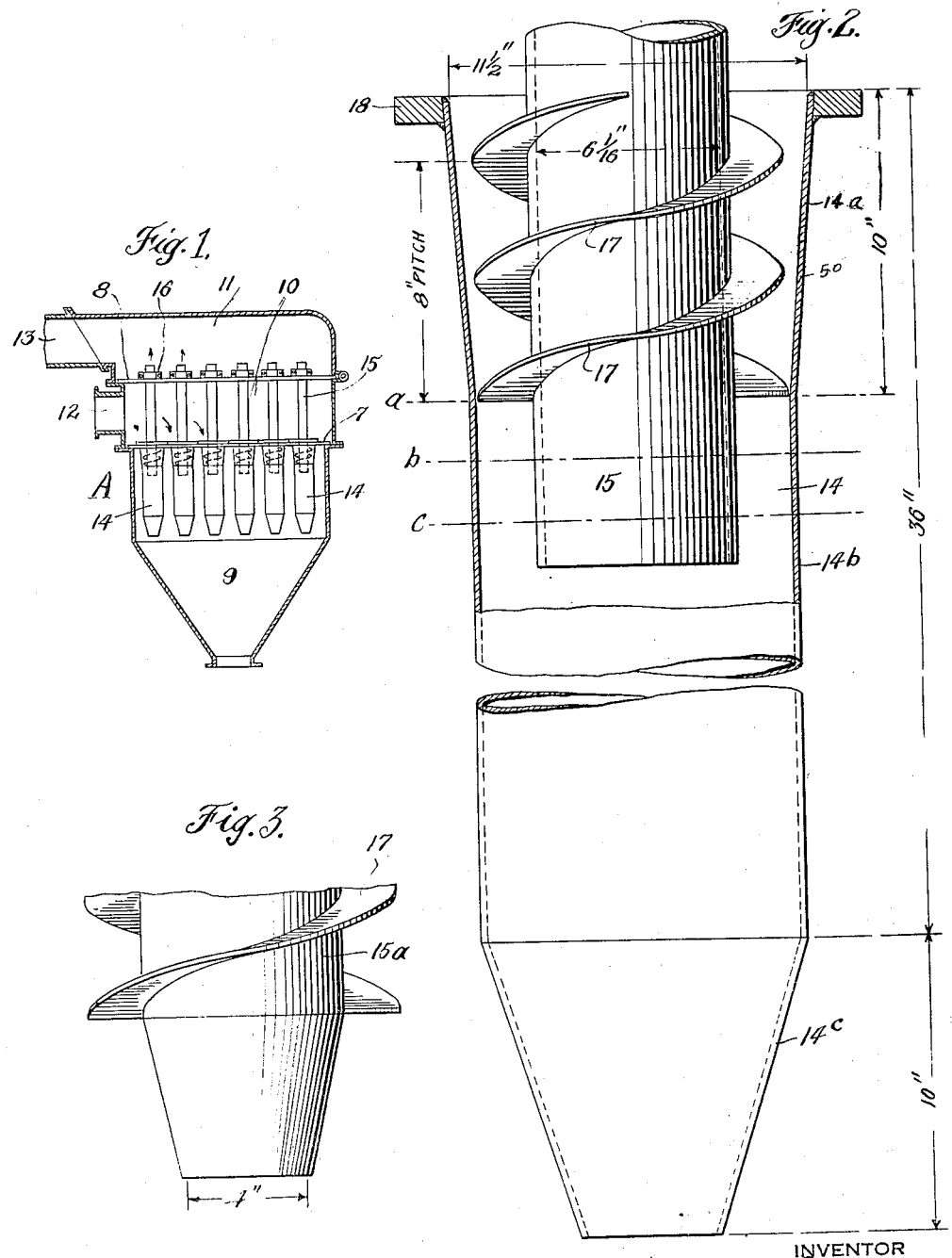
INVENTOR
Joe Crites
BY
Symmestredt & Lechner
ATTORNEYS Patented Feb. 2, 1954

2,667,944

UNITED STATES PATENT OFFICE 2,667,944

CYCLONE SEPARATOR

Joe Crites, Larchmont, N. Y., assignor to Combustion Engineering, Inc., New York, N. Y., a corporation of Delaware Application December 10, 1949, Serial No. 132,319

8 Claims. (Cl. 183—81)

This invention relates to the art of cyclone separation of solid matter from gases, such, for example, as the separation of fly ash from stack gases of power plants and the like.

It is well known that cyclone separators show a decrease in efficiency as the inlet velocity is decreased. Thus the efficiency at the full rated capacity for which the installation is designed is more than it is at half or a third capacity. Stated in another way, the greater the inlet velocity, the greater the efficiency and the greater the velocity the greater the pressure drop and the greater the power requirements. The difficulty is to obtain optimum efficiency with minimum pressure drop.

One of the objectives of the present invention is to provide a cyclone separator so designed that it may be operated at optimum efficiency with minimum pressure drop, and therefore with economy in power.

Another objective of the invention is to provide a cyclone of the character described which is adjustable to secure any desired operating conditions within practical limits.

Still another objective of the invention is to provide an efficient cyclone of very simple and inexpensive construction.

How the foregoing, together with such objects and advantages as may hereinafter appear or are incident to the invention, are realized is illustrated in the accompanying drawings, wherein—

Fig. 1 is a more or less diagrammatic cross section through a cyclone embodying my invention;

Fig. 2 is a partial side elevation and section of one of the cyclone units shown in Fig. 1, but drawn on an enlarged scale, and Fig. 3 illustrates a modification of the invention.

Referring now to Fig. 1, the reference character A indicates a cyclone separator embodying my invention, and which will first be generally described. The cyclone casing is compartmentized by partition plates 7 and 8, providing a lower dust collecting chamber 9, an intermediate plenum chamber 10, and an offtake chamber 11. The dust laden gases are introduced into the plenum chamber through the inlet 12. The clean gas is led from the offtake chamber 11 by means of the outlet 13 which is provided with a suitable fan or other means (not shown) for creating flow of the gases through the system.

Within the cyclone casing, a plurality of separating units are mounted, the number depending upon the total capacity desired. Each unit consists of an outer centrifugal tube 14 and an inner tube 15. The outer tubes are flanged at the top at 18 for coupling to the partition plate 7, from which they depend downwardly partway into the dust collecting chamber 9. Partition plate 7 has openings so that gas from the plenum chamber 10 may flow downwardly into the tubes 14.

The inner and smaller tubes 15 pass through openings in the partition plate 8 and depend downwardly from such plate, with their lower ends extending well into the upper ends of the tubes 14. The tubes 15 are vertically adjustable, to which end split collars 16 are provided. The halves of the split collars are bolted together as indicated, and rest upon the partition plate 8. By this arrangement the inner tubes may be adjusted to project a greater or lesser distance into tubes 14.

Each tube 15 carries a multiple helix 17, preferably a double helix. This double helix extends for a portion of the length of that part of the tube 15 which projects within a tube 14.

Dust laden gas is drawn from the plenum chamber into the annular spaces between the inner tubes 15 and the outer tubes 14 and has a vortical or cyclone movement imparted thereto by the helix with conversion of pressure into velocity. By reason of the high velocity vortical movement, dust particles are thrown outwardly and collect adjacent to the wall of the tubes 14, falling thereout along to the dust collecting chamber 9. The inner core (or inner vortex) of the gas in the tubes 14, which portion is now clean, is drawn upwardly through the inner tubes 15 into the offtake chamber 11 and thence through the outlet 13 to the stack or elsewhere.

Turning now particularly to Fig. 2, it will be seen that each of the tubes 14 has an outwardly flaring upper end portion 14a and an intermediate straight portion 14b, with a lower inwardly tapering bottom end portion 14c.

In the illustrative embodiment shown, the straight portion of the tubes 14 is 10" in diameter, and the portion 14a flares outwardly at approximately a 5° angle, making the top of the tube about 11½" in diameter. The length of the flaring portion 14a is approximately 10" from the point of juncture with the straight portion to the upper face of the flange 18. The inner tubes 15 are of standard 6" tubing, with a 6 1/16" I. D. The helix flights are desirably normal to the axis of the tubes 15, have an 8" pitch as indicated, and are of uniform diameter slightly less than the diameter of the straight portion 14b of the tubes 14, so as to provide free running contact. As shown, the helix desirably has a length substantially equal to the distance between the upper face of the flange and the point of juncture between portions 14a and 14b, in this case approximately 10". The lower portion of the tubes 15 extending below the lower end of the helix, is in the neighborhood of 5" in length.

In the position shown in Fig. 2 (hereinafter termed the "a" position), the bottom of the helix is opposite the point of juncture between portions 14a and 14b. In this position, theoretically, each flight contacts at a single point with the wall of the straight section 14b.

Because of the taper of the portion 14a there is a gradually increasing clearance space between the outer edges of the flights and the wall of the portion 14a providing for substantial leakage through such clearance space.

The illustrative unit is designed for 300 cubic feet per minute full rated capacity at 3.4" of water, with the gases at 70° F.

Tests were run with a unit on fly ash which had the following particle size distribution, the percentage given opposite the sizes being the cumulative amount finer than that size.

|  | Per cent |
|---|---|
| 40 mesh | 99.9 |
| 50 mesh | 99.6 |
| 70 mesh | 98.4 |
| 100 mesh | 97.7 |
| 200 mesh | 96.2 |
| 325 mesh | 84.6 |
| 40 micron | 82. |
| 20 micron | 60. |
| 10 micron | 30. |
| 5 micron | 8. |
| 2.5 micron | 1.6 |
| 1.5 micron | 1.5 |

These tests were run (a) with the parts shown in the position of Fig. 2; (b) with the tube 15 dropped 2", and (c) with the tube 15 dropped 4".

In the "a" position, as stated, the bottom of the helix is opposite the point of juncture between portions 14a and 14b, and for all practical purposes there is no running contact through 360° except at two theoretical points—180° apart, in the case of a two-flight helix.

In the "b" position, the lower end of the helix will be 2" below the point of juncture between parts 14a and 14b, i. e., each flight will have a 90° running contact with the straight wall of portion 14b, making a total of 180° of running contact with 180° open.

In this "b" position it will also be noted that, because of the lowering of the tube 15, the clearance space between the flaring portion 14a and the outer edges of the flights will have been reduced so that the leakage through such space will be correspondingly reduced.

In the "c" position there will be running contact between the flights and the wall of the portion 14b for a full 360°, and the leakage span still further reduced.

Typical results of many tests of the parts in the three positions noted are given in the following table in which "0" indicates the position of the parts shown in Fig. 2 or the "a" position; "2" indicates the "b" position; and "—4'" indicates the "c" position above mentioned:

| Position of helix_____inches__ | 0 | —2 | —4 |
|---|---|---|---|
| Air flow C. F. M. | 300 | 270 | 230 |
| Pressure drop_____inches__ | 2.7 | 2.7 | 2.7 |
| Efficiency of collector_____percent__ | 90.3 | 96.5 | 95.8 |

It will be seen from the above results that with the parts in position "a" and with the air flow 300 C. F. M., the pressure drop was 2.7" of water but the efficiency of collection was only 90.3%. However, when the tube 15 was lowered 2" to position "b" the capacity fell off only 10% but the efficiency increased to 96.5%. Moreover, when the parts were lowered still further to position "c" the capacity fell off another 15% and the efficiency decreased slightly.

It is apparent that the optimum position is position "b", wherein maximum efficiency is obtained with but small loss in capacity.

Probably a better way to express efficiency would be in percentage of dust loss. Thus with parts in position "a" the dust loss was 9.7% whereas in position "b" it was 3.5%. Thus by reducing the capacity 10% the dust loss was reduced about 65%.

It is apparent that some leakage of gas between the edge of the helix and the wall of the collector before the column of entering gas has been given its final spin, has a beneficial effect. The greater the mass of air or gas rotating at the periphery of the cyclone, the higher will be the rotational velocity of the inner vortex of the cyclone where the final separation is made.

Apparently there is a relationship between the number of degrees of running contact of the flights with the portion 14b and the amount of clearance between the flights and the portion 14a. When the running contact is substantially 0, as in the "a" position, in which position the clearance between the edges of the flights and the portion 14a is the greatest, relatively poor results are obtained, as contrasted with those obtained in the "b" position. Apparently the leakage is too great to secure the velocity needed to obtain optimum efficiency. Similarly, when there is 360° running contact, as in the "c" position, in which case the clearance between the edges of the flights and the portion 14a is the smallest, the results obtained are not quite as good as in the (b) position. In the "b" position where optimum results are obtained, the running contact is 180° and the amount of clearance of the flights for the portion 14a is of intermediate extent, securing the needed velocity for optimum separation while substantially retaining capacity, i. e., with relatively low increase in pressure drop.

It will be understood that the helix may have two or more flights as with two or any greater number of flights the inner vortex will not be thrown off-center, as would be the case of a single flight helix is employed, in which case the axis of the vortex will be shifted toward one side. It will also be understood that the helix may be longer than shown. It is, however, undesirable to have the helix of a length such that the upper end thereof extends into the plenum chamber as this would interfere with the free flow of gases therethrough.

Referring now to Fig. 3, the tubes 15a instead of being straight, have their lower ends tapered to decrease the inlet end from 6" to 4". This will have a tendency to increase the spinning effect and therefore the separating effect of the inner vortex. The concomitant increase in pressure is converted into velocity which gives the increased spinning effect. Some of the extra velocity pressure is regained in the expanding inlet nozzle (the tapered end) but the capacity is not as good as with the straight tube.

I claim:
1. In a cyclone separator for separating particles of solid matter from gases carrying the same, an outer open ended tube having its inlet end portion tapered inwardly and a straight portion with which said tapered portion merges, an inner open ended tube of smaller diameter ex- tending part-way into said outer tube and having its inlet end terminating at a point beyond the point of juncture of said tapered portion with said straight portion but short of the outlet end of the outer tube, and a two-flight helix carried by said inner tube terminating short of the inlet end of said inner tube the flights of which have a diameter slightly less than the internal diameter of said straight portion and such as to provide a clearance between the helix and the wall of the outer tube progressively increasing in a direction toward the inlet end of the outer tube and a length comparable with that of the tapered portion of the outer tube, the inner tube being positioned with respect to the outer tube such that the bottom end of the helix lies in a position in the region defined by a point substantially opposite the point of juncture between the tapered portion and the straight portion of the outer tube and a point therebelow at which the helix would have substantially 360° running contact if the flight actually had contact with the straight portion of the outer tube.

2. In a cyclone separator, a casing partitioned to provide a dust collecting chamber, an inlet chamber for gases laden with solid particles, and an offtake chamber, and a separator unit associated therewith comprising an outer tube having its inlet end communicating with said inlet chamber and its outlet end with said collecting chamber, said outer tube having a straight portion and a flared inlet portion flaring outwardly from said straight portion toward the inlet end of said outer tube, an inner tube of small diameter extending through said flared portion into said straight portion and having its outlet end communicating with said offtake chamber, and a multiple flight helix concentric with said tubes and disposed therebetween with free running contact with the outer tube in the region of said straight portion, and with progressively increasing clearance with respect to the inner wall of the flared portion of the outer tube toward the inlet end thereof, the helix being positioned with respect to the outer tube such that the bottom end of the helix lies in a position in the region defined by a point substantially opposite the point of juncture between the tapered portion and the straight portion of the outer tube and a point therebelow at which the helix would have substantially 360° running contact if the flight actually had contact with the straight portion of the outer tube.

3. The separator of claim 2 in which the helix is carried by the inner tube.

4. The separator of claim 3 characterized in that means are provided for adjusting the position of the helix lengthwise of the outer tube between said points.

5. The separator of claim 3 in which the inner tube is so positioned with respect to the outer tube that the helix extends into the said straight tube a distance of substantially a quarter-turn of the helix.

6. The separator of claim 2 in which the inner tube is straight for its full length.

7. The separator of claim 2 in which the inner tube is straight save for its inlet end portion which tapers inwardly from the main body portion thereof.

8. The separator of claim 2 in which the helix has two flights.

JOE CRITES.

References Cited in the file of this patent

UNITED STATES PATENTS

| Number | Name | Date |
|---|---|---|
| 1,909,184 | Lissman | May 16, 1933 |
| 2,461,677 | Burdock et al. | Feb. 15, 1949 |

FOREIGN PATENTS

| Number | Country | Date |
|---|---|---|
| 736,197 | France | Sept. 12, 1932 |